United States Patent [19]

Straus et al.

[11] 4,075,474

[45] Feb. 21, 1978

[54] METHOD AND APPARATUS FOR DISTORTION REDUCTION IN OPTICAL COMMUNICATION SYSTEMS

[75] Inventors: Jozef Straus; Otto Istvan Szentesi, both of Ottawa, Canada

[73] Assignee: Northern Telecom Limited, Montreal, Canada

[21] Appl. No.: 788,789

[22] Filed: Apr. 19, 1977

[51] Int. Cl.² .................. H04B 9/00; G05D 25/02
[52] U.S. Cl. ................................. 250/199; 250/205; 332/7.51
[58] Field of Search ............... 250/199, 205; 332/7.51

[56] References Cited

U.S. PATENT DOCUMENTS

| 3,931,512 | 1/1976 | Kent | 250/199 |
| 4,008,390 | 2/1977 | Runge | 250/199 |
| 4,009,385 | 2/1977 | Sell | 250/199 |

*Primary Examiner*—Howard W. Britton
*Attorney, Agent, or Firm*—Achmed N. Sadik

[57] ABSTRACT

An optical transmitter suitable for analog transmission in optic fiber communication systems utilizes two matched light emitting diodes to achieve distortion reduction.

10 Claims, 6 Drawing Figures

METHOD AND APPARATUS FOR DISTORTION REDUCTION IN OPTICAL COMMUNICATION SYSTEMS

FIELD OF THE INVENTION

The present invention relates to optical transmitters with reduced distortion of the optical output intensity. Such devices are particularly suited to analog transmission schemes in the field of optical fiber communications.

BACKGROUND OF THE INVENTION

The development of practical optical fiber systems has just begun. Such systems utilize modulated light sources, primarily semiconductor light emitting diodes (LEDs), the optical output of which is guided via an optical fiber link to a receiving site. The optical power energy emerging from the fiber then impinges upon a photodetector, usually a back-biased P-I-N semiconductor diode or the like, in which electrical charge carriers are generated and thereafter amplified to yield a useful output signal.

Hence, there are three crucial components in such systems. The optical power source or transmitter, the optical fiber link, and the photodetector or receiver. Should the transmission mode be analog, nonlinear distortion becomes a factor affecting the integrity of operation possibly to the extent that a practical system cannot be realized. The problem of nonlinear distortion is, of course, not new to optical fiber systems. It is, however, a stumbling block here more than in other systems because practical light sources such as LEDs produce a light output the intensity of which does not vary with sufficient linearity with the electrical input signal. As a result, second and third order nonlinearities would produce distortion in, say, a transmitted analog video signal, thereby limiting the quality of transmission. As a result, transmission over longer distances would not be possible. While of course the photodetector is also not fully linear, its contribution to distortion of the signal has been shown to be minimal in comparison with the LED produced distortion.

SUMMARY OF THE INVENTION

The present invention provides an optical transmitter, in a specific example utilizing LEDs as electrical-to-optical converters and photodetectors as optical-to-electrical converters, that produces an optical output signal more linearly related to the electrical input signal than has hitherto been possible. In simple terms, the final electrical-to-optical converter in the optical transmitter is modulated or excited by a modified electrical signal rather than by the original electrical input signal. As those skilled in the art will later on recognize, the amount of reduction in distortion will depend on the similarity of the electrical-to-optical transfer characteristics of the two electrical-to-optical converters utilized.

Accordingly there is provided an optical transmitter having two parallel signal paths and comprising signal dividing means for coupling a first component of an electrical input signal to a first of said signal paths, and a second component of said input signal to a second of said signal paths, said first signal path including a first electrical-to-optical converter optically coupled to an optical-to-electrical converter, said second signal path providing a predetermined electrical delay, means providing the instantaneous difference between signals at the ends of said first and second signal paths, and a second electrical-to-optical converter for converting said instantaneous difference into an optical output.

Although the above optical transmitter linearizes the optical output of less linear converters, it should be clear that the more linear the converters utilized the more linear is the final output. Such linearization it must also be understood, is accomplished at the cost of higher complexity as well as some degradation in the signal-to-noise ratio. The latter, however, may be ignored if the input signal-to-noise ratio is reasonable to begin with. The degradation of signal-to-noise ratio should not be considerably more than 5 decibels.

BRIEF DESCRIPTION OF THE DRAWINGS

An example embodiment will now be described in conjunction with the accompanying drawings in which.

DESCRIPTION OF THE EXAMPLE EMBODIMENT

Figure 1:
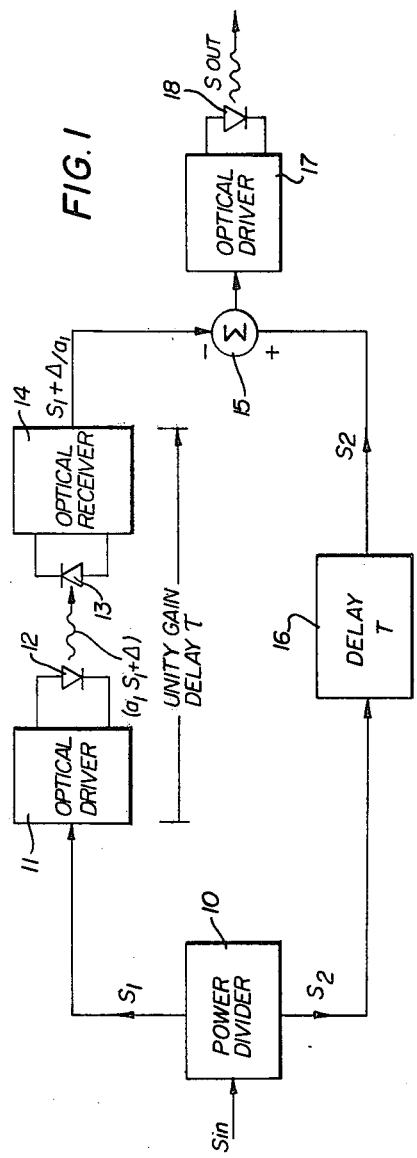
FIG. 1 is a schematic of an optical transmitter in accordance with the present invention.

With reference to FIG. 1, the optical transmitter according to the present invention comprises a power divider 10 dividing a thereto input signal $S_{in}$ into two signal components $S_1$ and $S_2$. The signal $S_1$ is applied to optical driver 11, driving (i.e. biasing and modulating) a light emitting diode (LED) 12, the optical output of which is coupled to a photodiode 13, such as a P-I-N photodiode, which is electrically coupled to an optical receiver 14. The output of the optical receiver 14 is fed into a subtracting port of a summer 15, the other adding port of which receives the signal $S_2$ delayed by a period $\tau$ by means of a delay network 16. The delay $\tau$ is chosen to be equal to the delay that the signal $S_1$ is subjected to from the input of the optical driver 11 to the output of the optical receiver 14. The reason being that both $S_1$ and $S_2$ should arrive at the summer 15 having as close to 0° phase angle between them as is practicable. Usually $\tau$ is a delay in the order of a few billionths of a second. The output of the summer 15 is fed into an identical optical driver 17 to the optical driver 11. The optical driver 17 also drives a LED 18 identical to the LED 12.

To explain how the circuit operates in simple terms, first, we consider only first order distortion cancellation effects. The signal $S_1$ is converted via the optical driver 11 and the LED 12 into an equivalent optical signal ($a_1 S_1 + \Delta$), where $a_1$ is an electrical-to-optical conversion factor, and $\Delta$ is the amount of distortion introduced by the LED 12. The optical signal ($a_1 S_1 + \Delta$) is coupled directly to the P-I-N photodiode 13 and converted therein into an electrical signal which is then amplified by the optical receiver 14. In the embodiment of FIG. 1 the gain of the optical receiver 14 is such that the original electrical input signal $S_1$ emerges with the distortion $\Delta/a_1$ added thereto. This, of course, assuming no distortion added by the P-I-N photodiode 13 and subsequent optical receiver 14. Thus, the signal $S_1$ experiences a total gain of unity from the input of the optical driver 11 to the output of the optical receiver 14. If the power divider 10 was such that $S_2 = 2S_1$, then the output signal at the output of the summer 15 would be:

$$S_2 - (S_1 + \frac{\Delta}{a_1}) = 2S_1 - S_1 - \frac{\Delta}{a_1} = S_1 - \frac{\Delta}{a_1}$$

The output optical power $S_{out}$ of the LED 18 would be:

$$S_{out} = a_1(S_1 - \frac{\Delta}{a_1}) + \Delta = a_1 S_1.$$

Of course, $\Delta/a_1$ is much smaller than $S_1$ and the distortion introduced by this term may be ignored for a first order approximation. In other words, the electrical signal $S_1$ was converted to the optical signal $S_{out}$ with the LED distortion absent.

A more elaborate analysis shows that all distortion is not fully eliminated. We assume that the LED transfer function is given by:

$$S_{LED} = a_1 S + a_2 S^2 + a_3 S^3 + a_4 S^4 + \ldots,$$

where $S_{LED}$ is the optical output power of the LED and $S$ the electrical signal current through the LED. $a_1$, of course, is the conversion efficiency of the LED. $a_2$, $a_3$, etc. are second, third, etc. order distortion factors, and it is often sufficient to consider terms only up to $a_3$. Performing the analysis for the circuit of FIG. 1 with $S_2 = 2S_1$ we find that, theoretically, there are no second order distortion products present. The third order distortion products would be reduced if:

$$\left| -\frac{2a_2^2}{a_1} \right| < |a_3|$$

Those skilled in the art will recognize that the above condition would often apply. Yet higher order distortion products are negligible and will not be considered.

Figure 2:
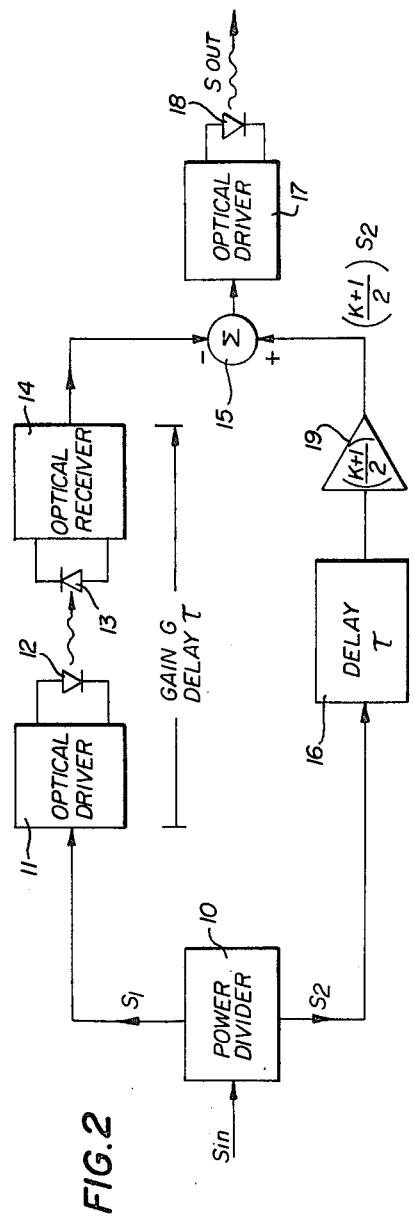
FIG. 2 is a variation of the schematic of FIG. 1.

Turning now to FIG. 2 of the drawings, we discuss a more general case than that considered in conjunction with FIG. 1. In the path of the signal $S_2$ there is added an amplifier 19 providing a gain (or loss) factor equal to $(K+1/2)$. In addition, the path of the signal $S_1$ is assumed in FIG. 2 to have a general gain (or loss) factor of G. Assuming for the moment that G = 1, then for K = 1 we have again the case of FIG. 1, i.e. second order distortion cancellations. To cancel, third order distortion K should assume a different value from unity, namely K should satisfy the cubic equation:

$$K^3 - 2K \frac{a_2^2}{a_1 a_3} - 1 = 0.$$

Such equation always has a real root, which root is the desired value for K. In practice, adjustment of the gain of the amplifier 19 would permit an intermediate optimal setting. One may choose a point between full cancellation of either of the second or third order distortion products.

A still more general case is given for G different from unity, in which case it can be shown that for second order distortion cancellation K should be as follows:

$$K = 2G - 1.$$

This means that the gain factor of the amplifier 19 $(K+1/2)$ must equal G. Again, by varying K, third instead of second order distortion cancellation may be achieved.

Whether one opts for second or third order cancellation, it will be recognized that a general reduction will result in most distortion products. Clearly the higher the order of the distortion product, the less pronounced is the improvement.

Figure 3:
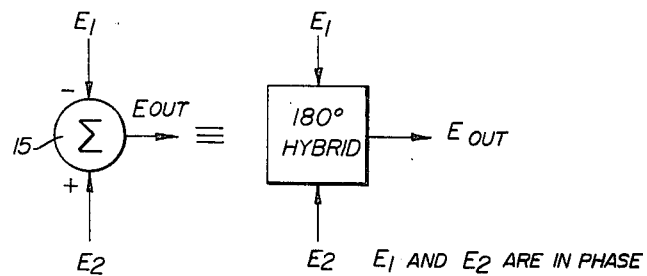
FIG. 3 shows how a 180° hybrid transformer may be used to provide the difference between two in-phase signals for use in the transmitters of FIGS. 1 or 2.

Before proceeding to describe some other subsidiary details it should be mentioned that second harmonic distortion was reduced by some 25 dB and third harmonic distortion by some 15 dB in a measurement along the lines of the embodiment shown in FIG. 1. These improvements were achieved at fundamental frequencies varying from a few KHz to a few MHz. The components used were off-the-shelf components. For instance, for the summer 15, a 180° hybrid was used as shown in FIG. 3. Since the input signals $E_1$ and $E_2$ ($S_1$ and $S_2$ in FIG. 1) are in-phase the 180° hybrid produces their difference. Such a hybrid is supplied by Anzac as part No. HH108 for 0.2 to 35 MHz.

Figure 4:
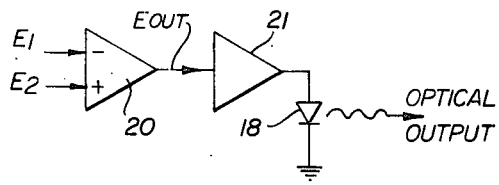
FIG. 4 shows a difference amplifier for forming the difference between two signals followed by an optical driver and a light emitting diode for use in the transmitters of FIGS. 1 or 2.

Another alternative to the arrangement of FIG. 3 is that shown in FIG. 4 of the drawings. There a difference amplifier 20 is used. Such devices are common in the art of signal processing. The difference amplifier 20 then feeds an optical driver 21 directly. An excellent optical driver suitable for such applications has been disclosed in an article entitled: "A 120MHz Bandwidth Linear Signal Transmission System Using Fiber Optics" by James C. Blackburn in the IEEE Transactions on Instrumentation and Measurements, 1975, pp 230–232, FIG. 4 on p.231. Of course, other less elaborate amplifiers may suffice for some applications. Such an optical driver directly biases and modulates the LED 18.

Figure 5:
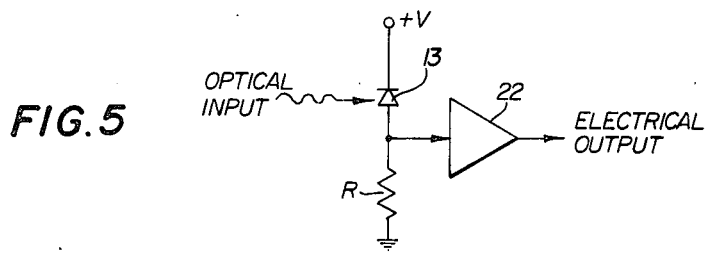
FIG. 5 shows how a P-I-N photodiode may be biased and connected to an optical receiver for use with the transmitters of FIGS. 1 or 2.

As to optical receivers, an arrangement such as that shown in FIG. 5 of the drawings is often suitable. In that Figure a reverse biasing resistor R is utilized, its value usually chosen to optimize the noise behaviour of subsequent amplifier 22. A suitable simple amplifier is part No. XL152 of Texas Instruments. On the other hand, RCA supplies an integral photodiode/amplifier arrangement under part No. C30818/819, particularly suitable for analog applications up to several MHz.

Figure 6:
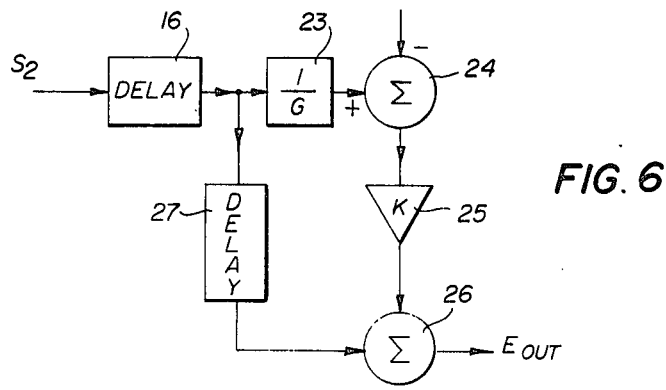
FIG. 6 is a variation on a portion of the schematic of FIG. 1.

FIG. 6 of the drawings shows yet another arrangement for achieving the same result of distortion reduction. In this arrangement, the path of the signal $S_2$ is split into two paths carrying equal signal powers. Thd additional path is delayed by delay network 27 so that both signals arriving at a final summer 26 arrive in phase. The main path from the delay network 16 goes through an amplifier/attenuator to ensure that the signals arriving at a first summer 24 have the same magnitude. The output of the summer 24 is then fed through an amplifier 25 and on to the summer 26, the output of which drives the final optical driver. For K = 1, second order distortion products will be cancelled as was the case in FIG. 1, but for K as follows:

$$K = \frac{a_3}{a_1 a_3 + 2a_2^2}$$

the third order distortion products will cancel, and the second order distortion products will be less if $$\left| \frac{2a_2^3}{a_1 a_3 + 2a_2^2} \right| < |a_2|$$

The above condition generally always applies. Again, one may choose to optimize between second and third order cancellation by setting K to have an intermediate value, preferably by means of practical experimentation.

What is claimed is:

1. An optical transmitter having two parallel signal paths and comprising:
   signal dividing means for coupling a first component of an electrical input signal to a first of said signal paths, and a second component of said input signal to a second of said signal paths;
   said first signal path including a first electrical-to-optical converter optically coupled to an optical-to-electrical converter;
   said second signal path providing a predetermined electrical delay;
   means providing the instantaneous difference between signals at the ends of said first and second signal paths; and
   a second electrical-to-optical converter for converting said instantaneous difference into an optical output.

2. The optical transmitter according to claim 1, said first and second electrical-to-optical converters having similar electrical-to-optical transfer characteristics, and said delay provided by said second optical path being substantially equal to the total delay of said first signal path.

3. The optical transmitter according to claim 2, said first and second electrical-to-optical converter being semiconductor light emitting diodes, and said optical-to-electrical converter being a semiconductor photodiode.

4. The optical transmitter according to claim 3, said second signal path including means for adjusting the signal power therethrough.

5. The optical transmitter according to claim 1, said first component of said input signal containing half the power contained in said second component.

6. The optical transmitter according to claim 2, said first component of said input signal containing half the power contained in said second component.

7. The optical transmitter according to claim 3, said first component of said input signal containing half the power contained in said second component.

8. The optical transmitter according to claim 1, said signals at the ends of said first and second signal paths containing signal powers in the ratio of (K+1):G, G being the quotient of the power at the end of said first signal path by the power at its beginning, and K being a predetermined real number.

9. The optical transmitter according to claim 2, said signals at the ends of said first and second signal paths containing signal powers in the ratio of (K+1):G, G being the quotient of the power at the end of said first signal path by the power at its beginning, and K being a predetermined real number.

10. The optical transmitter according to claim 3, said signals at the ends of said first and second signal paths containing signal powers in the ratio of (K+1):G, G being the quotient of the power at the end of said first signal path by the power at its beginning, and K being a predetermined real number.

* * * * *